INVENTOR
JOHN V. WERME
BY
ATTORNEY

INVENTOR.
JOHN V. WERME
BY John F. Lukes
ATTORNEY

INVENTOR
JOHN V. WERME
BY John F. Lahue
ATTORNEY

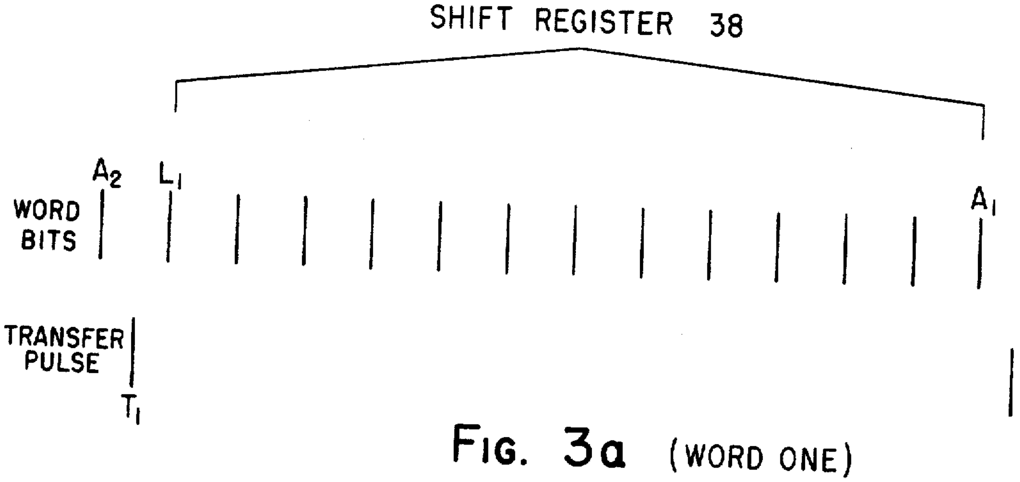
FIG. 3a (WORD ONE)
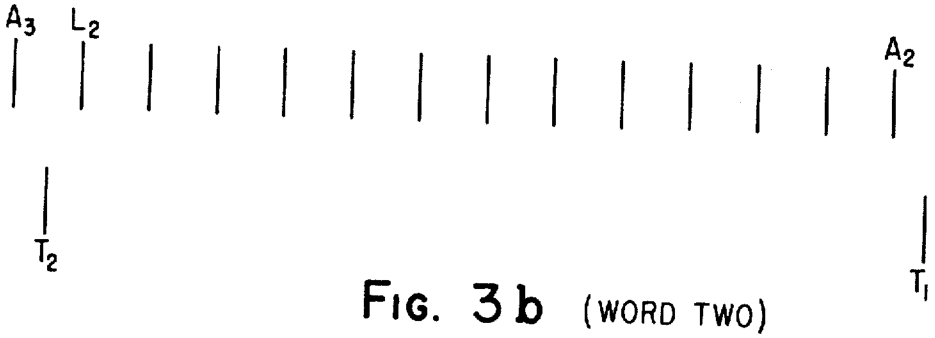
FIG. 3b (WORD TWO)
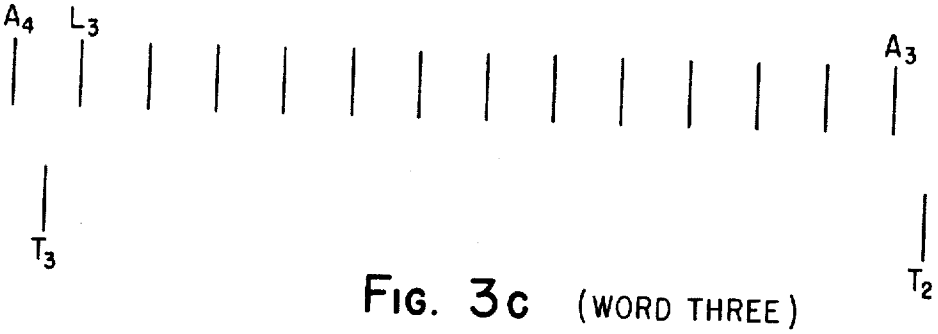
FIG. 3c (WORD THREE)
INVENTOR.
JOHN V. WERME
BY
ATTORNEY INVENTOR.
JOHN V. WERME
BY Jack F. Lukes
ATTORNEY 3,406,387
CHRONOLOGICAL TREND RECORDER WITH UPDATED MEMORY AND CRT DISPLAY

John V. Werme, Painesville, Ohio, assignor to Bailey Meter Company, a corporation of Delaware Filed Jan. 25, 1965, Ser. No. 427,900
12 Claims. (Cl. 340—324)

ABSTRACT OF THE DISCLOSURE

A data display system for displaying a chronological trend of one or more variables on a cathode ray tube oscilloscope. The data associated with each variable is transmitted chronologically from a data storage apparatus to the cathode ray tube where it is displayed as a series of dots. The magnitude of the data establishes the Y position of the data, whereas a series of position signals establishes the X position of each dot so as to maintain the oldest variable data at the left edge of the cathode ray tube and the latest variable data at the right edge of the cathode ray tube.

This invention relates to an oscilloscope display. In particular this invention relates to a system for displaying on the cathode ray tube of an oscilloscope the stored historical data of a variable quantity.

When controlling many processes it is often desirable to know the past behavior of a variable for a relatively short period of time. The recorder on which such information is displayed need not be extremely accurate since its main purpose is to display the variable's trend. Many schemes have been proposed in an attempt to come up with an acceptable trend recording device. These include chemical reaction on special paper, electrostatic charges on a moving surface and a hot stylus tracing on a wax surface, to name only a few. While most of these earlier schemes for trend recording were satisfactory to a degree they all left something to be desired and have never been completely accepted. In the case of the chemical reaction method the reaction eventually was irreversible and the old trace was not completely erased. The electrostatic charge method always left some particles from the previous traces which tended to obscure the latest trend. Likewise the hot stylus proved less than completely satisfactory because ambient temperatures sometimes distorted the recorded trend.

One piece of electronic test equipment familiar to almost all electrical engineers and to many in fields of endeavor not closely related to electronics, is the cathode ray oscilloscope. The garden variety oscilloscope has the capability of displaying the variations of one variable with respect to a second variable. When the second variable is time the oscilloscope becomes ideally suited for displaying the variations of a quantity with respect to time. Unfortunately, the time base, that is, the length of time represented by the display, on all presently available oscilloscopes, is extremely short and not at all suited for displaying the trend of a variable for an extended period, such as an hour.

A very important piece of equipment found in almost all computers available today is its memory. The computer's memory has often been referred to as its brain. Here is stored all the information which a computer needs to perform its assigned tasks. A memory can store the values of a variable quantity for any desired length of time; a minute, a day or month, if necessary. This information can be used and reused whenever desired without changing the stored value; it can be removed and replaced with current data as often as desired. Some of the many memory devices in use today include the well known magnetic drum, magnetic cores, magnetic tape and arrays of capacitors. Regardless of the type used their only function is information storage for use whenever necessary.

My invention makes use of the storing abilities of a computer's memory and the display capability of an oscilloscope. By continuously reading the values of a stored variable and feeding them to the oscilloscope I provide a trend recording device which displays the recent trend of a variable.

An object of my invention is to provide an oscilloscope display system indicating the recent trend of a variable.

Another object of my invention is to provide a trend recorder displaying on an oscilloscope the latest readings of a variable as stored in a memory.

Still another object of my invention is to provide a trend recorder displaying on the cathode ray tube of an oscilloscope the trend of a variable by a series of dots.

In one embodiment of my invention I use a rotatable magnetic drum having three sections, one for storing the current readings of a multitude of variables, a second for storing information for programming the system operation and a third section for storing the historical data of a variable selected for display on an oscilloscope. The historical information is continuously updated by transferring a reading from the current data section to the historical storage section at preselected intervals. As the magnetic drum rotates the historical data is transferred to a register circuit and then converted from digital to analog form for display on the cathode ray tube of an oscilloscope.

Other objects and advantages of my invention will be apparent from a reading of the following description and as set forth in the appended claims.

Referring to the drawings.

Figure 3:
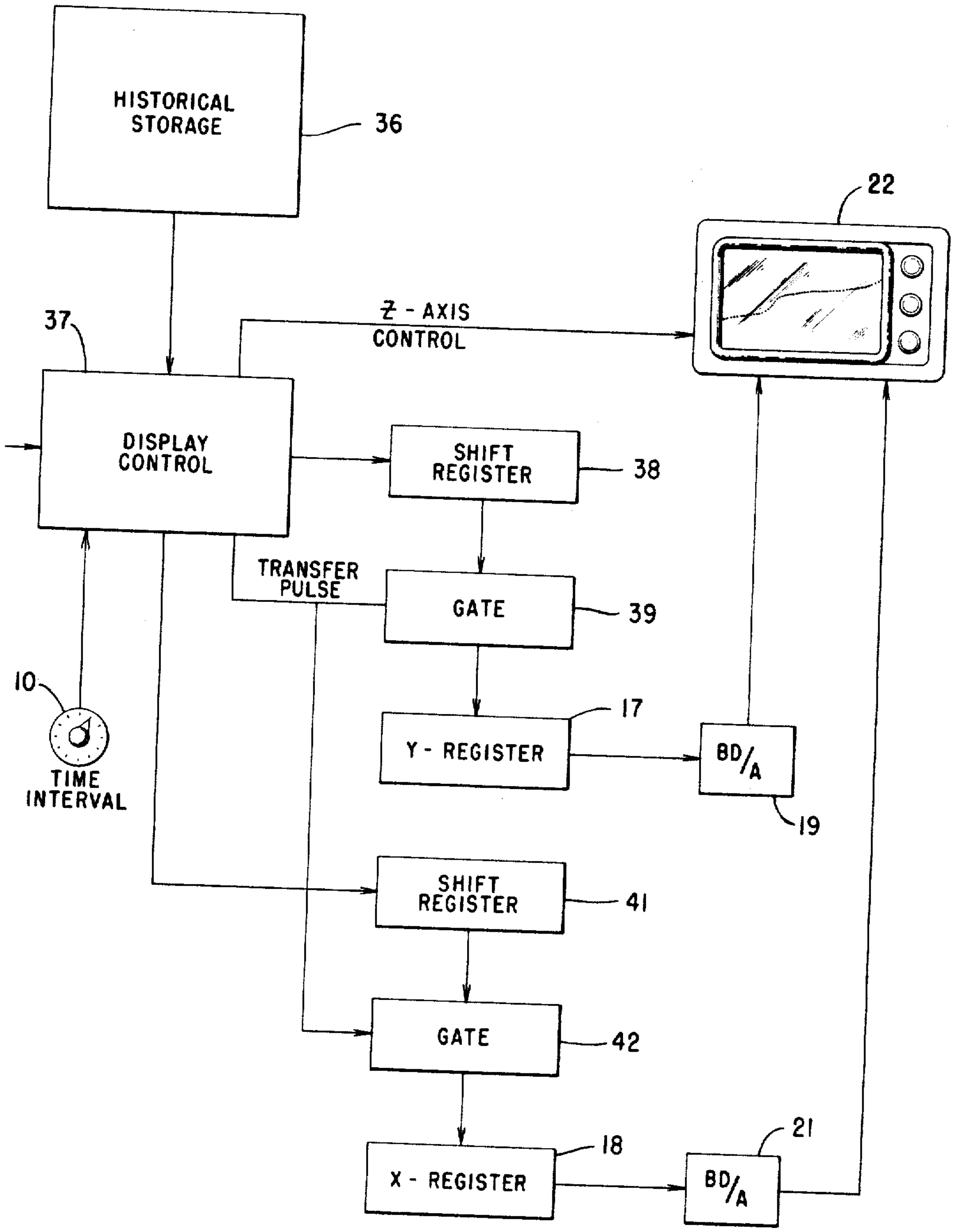
FIG. 3 is a schematic diagram of a shift register and transfer circuit.

FIGS. 3*a*, 3*b* and 3*c* are diagrams useful in explaining the operation of the embodiment of my invention shown in FIG. 3.

Figure 4:
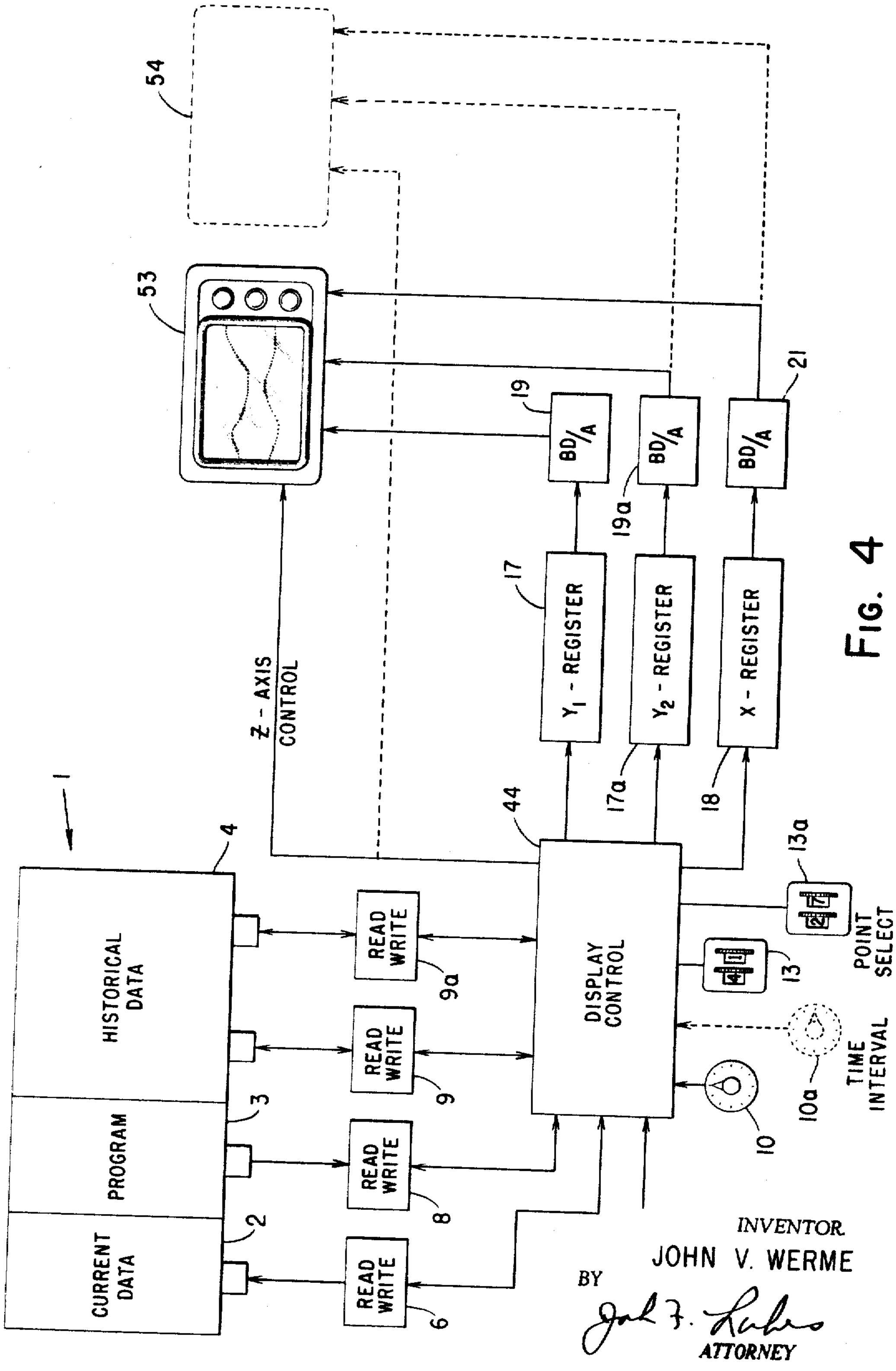

FIG. 4 is a block diagram of an oscilloscope display system for displaying two variables on the same cathode ray tube.

Figure 1:
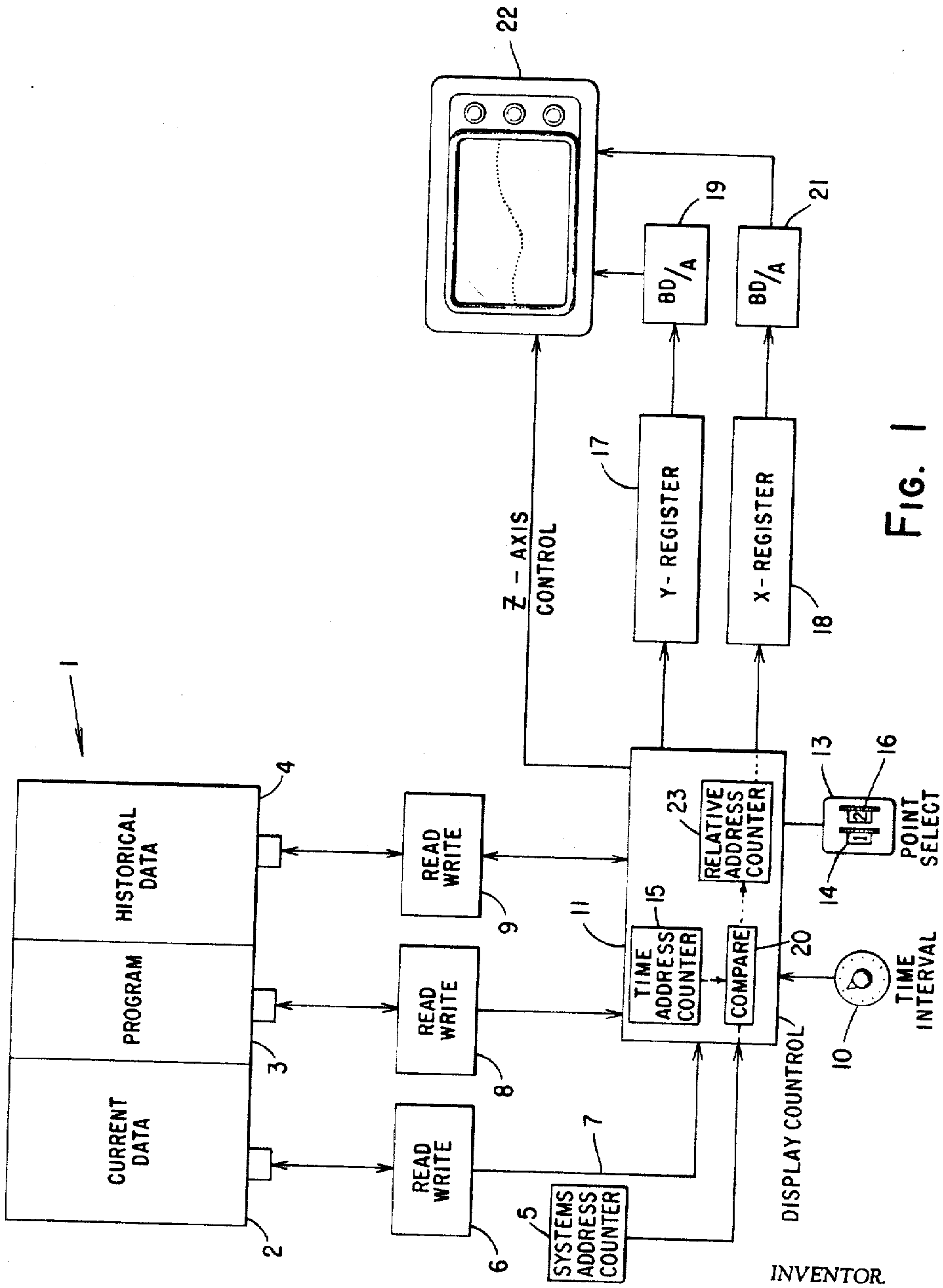
FIG. 1 is a block diagram of an oscilloscope display system using a magnetic drum for information storage.

Referring to FIG. 1, I show an oscilloscope display system employing a magnetic drum 1, rotatable by any suitable means (not shown) having a current data storage section 2, a program storage section 3 and a historical data storage section 4. The various storage sections of the magnetic drum can, for example, contain magnetic means arranged in rows or tracks around the circumference to store up to 100 words as they are called, each word consisting of 25 bits. The number of words capable of being stored on the circumference of a drum is a matter of design and holds no particular significance. The current data storage section, as the name implies, has stored therein the latest readings for the measured variables. It can have any number of tracks as necessary to handle the measured variables. Information is written into and read from the current data section 2 by a read/write amplifier 6. The read/write amplifier 6 receives information through a display control 11 over a line 7 which connects to the measuring part of the system, not shown in FIG. 1. To control the overall operation of the display system an operating program is stored in the information storage section 3. This programming takes place prior to putting the display system into operation. A read amplifier 8, connected to the program storage section 3, reads the program from the drum as it revolves and supplies it for use in the system at the appropriate time. The historical data storage section 4, again as the name implies, stores the recent history of a selected number of variables. These variables correspond to certain ones stored in the current data section 2 and programmed in the program section 3. In the historical data section 4 each variable selected for display purposes has been assigned a separate track, if 25 variables have been selected for trend display the historical data section would have a minimum of 25 tracks. Any number of variables can be selected for display purposes, this again is a matter of design and of interest this time only for descriptive purposes. Since the historical data storage section 4 has one variable assigned to each track, every variable in this section has 100 readings stored at any given time. The first reading of a variable stored in this section is the oldest and the last reading stored the most recent. Updating of the information takes place by removing the oldest reading and replacing it with the current reading at selected time intervals. A read/write amplifier 9 writes the information into and reads it from the historical data storage section 4.

The read/write amplifiers 6, 8 and 9 are basic computer components. The write section of the amplifier generates heavy current pulses to magnetize the drum's surface a bit at a time. It is a power amplifier which accepts a pulse train of data at its input and generates current pulses which causes word bits to be written on the drum. The read section of the amplifier is a high gain voltage device whose job is to accept the low level read-back signals from the drum and to amplify and shape them into the proper pulse train. In the read/write amplifiers 6, 8 and 9 the reading and writing operations never occur simultaneously, only one or the other can be performed at any instant of time. Although somewhat brief, this description of read/write amplifier operation should suffice to clarify the meaning of the terms read and write. Read meaning to use the stored information and write meaning to store information.

Information storage on and reading from the historical data storage section 4 and the current data section 2 is controlled by a display control 11 in conjunction with the program stored in the program storage section 3. The internal components of the display control 11 and their interconnections can take many forms, since the components are standard computer hardware and since their actual connection is basic, little description is deemed necessary. Externally the display control 11 includes a time interval switch 10 which controls the elapsed time between the storage of readings in the historical data storage section 4. Put another way, the time interval switch 10 provides a means for varying the time interval between subsequent transfers of information from the current data section 2 to the historical data storage section 4. In a typical display system the time interval switch 10 could be constructed to provide a means for varying the frequency of the sampling time from 15 seconds to 2 minutes. With a sampling frequency of 15 seconds, the data in the historical section is updated every 15 seconds by removing the oldest stored reading and replacing it with the latest sample. Using a magnetic drum with a 100 word capacity around its circumference gives each value stored therein a 25 minute life. Also connected to the display control circuit 11 is a point select switch 13. The point select switch shown includes two thumbwheel switches 14 and 16, each having ten positions from 0 to 9. The switches provide a means for selecting any number from 00 to 99. If more than 100 variables have been selected for display then a 3 or 4 position point select switch would be required. The numbers appearing in the point select switch 13 correspond to information storage tracks in the historical data section 4. Each variable selected for display purposes is assigned one number which is known as its address. In FIG. 1, the number 12 has been set into the point select switch 13 which means the address of the variable selected for display is stored at track 12 of the historical section 4.

As the magnetic drum 1 rotates the read/write amplifier 9 reads the stored information from the track selected by the point select switch 13 and shifts it into a Y-register 17. Simultaneously with the shifting of historical information into the Y-register 17 a signal from the display control 11 shifts a series of timing pulses into an X-register 18. Registers 17 and 18 are identical in construction and operation; they are essentially temporary storage means for the information read from the magnetic drum 1. The binary information held is a series of pulses of either a logic ONE or logic ZERO and can be shifted into the register either serially or by parallel entry. Basically a register is nothing more than a series of interconnected flip-flop circuits having two stable states. With serial entry each word pulse enters the register at the first flip-flop and is continuously shifted to the next flip-flop until the last word pulse enters the register. During the entry of information into a register its condition is unstable and its output a jumble of useless information. Thus, before the information shifted into either the Y-register 17 or the X-register 18 can be used the register operation must stabilize. Connected to the Y-register 17 is a binary decimal/analog converter 19 for converting the binary information to an equivalent analog voltage. Similarly a binary decimal/analog converter 21 connects to the X-register 18 to convert the binary timing pulses to an equivalent analog voltage. The binary decimal/analog converters 19 and 21 are identical and produce an analog output which is a linear function of the binary decimal input signal. Typically converters of the type shown have an analog output range of 0 to 3.999 volts and a binary decimal input from 0000 to 3999. A binary decimal/analog converter has a plurality of input logic circuits which act as switches between constant current sources and a common output bus. A logic ZERO applied to an input circuit completes a connection from a constant current source of known magnitude to the common bus. When two or more inputs of logic ZERO level are applied to the converter, the currents from the various sources add together thereby producing an analog current signal proportional to the number and arrangement of the logic ZEROS.

The analog output of the converter 19 represents in analog form the value of the variable stored at address 12 at a point in time represented by the analog output of the converter 21. The analog output of the converter 19 connects to the Y-axis amplifier (not shown) of an oscilloscope 22. Oscilloscopes of the type used in my system are simple instruments for two dimensional display; it includes a cathode ray tube having horizontal deflection plates and vertical deflection plates. A Y-axis amplifier connects to the vertical plates and positions an electron beam in accordance with its input signal. Similarly, an X-axis amplifier connects to the horizontal deflection plates to position the electron beam in accordance with its input signal. When separate input signals are connected to the X-axis amplifier and the Y-axis amplifier the electron beam will be positioned both vertically and horizontally in accordance with the input to both amplifiers. In my system the signal connected to the Y-axis amplifier is the analog output of the binary decimal/analog converter 19 and the signal connected to the X-axis amplifier is the analog output of the binary decimal/analog converter 21. Thus, the electron beam of the oscilloscope 22 will be positioned vertically by the value of the variable stored at track 12 of the historical data section 4 and horizontally by the timing signal from the display control 11. To control the intensity of the electron beam on the face of the cathode ray tube, the oscilloscope 22 is equipped with a Z-axis amplifier. By controlling the input signal to the Z-axis amplifier the display can be made as bright as desired and even turned-off. This turned-off feature is particularly advantageous as it can be used to blank-out the display during the unstable state of the X and Y registers, this will be explained further as the description proceeds.

*Operation of FIG. 1*

The operator sets the point select switch 13 to the desired address, in this case, 12; he also sets the time interval switch 10 for the desired time interval between subsequent readings stored in the historical data section 4. As the first of the 100 words stored at track 12 lines up with the read/write amplifier 9 its value is serially shifted to the Y-register 17 and converted to an analog signal by converter 19. Simultaneously, a timing signal is serially shifted into the X-register 18 and converted to an analog voltage by the converter 21. During the shifting operation the registers are in a state of flux and their outputs will be varying widely. To prevent displaying this unstable condition on the oscilloscope 22, a signal from the display control 11 causes the Z-axis amplifier to reduce the intensity of the electron beam thereby turning off the display. When the shifting operation has been completed the Z-axis amplifier turns-up the intensity of the electron beam and a spot appears at the first position on the left side of the display. The vertical height of the spot being controlled by the output of the binary decimal/analog converter 19. Assume, for purposes of discussion, that the binary decimal number stored at the first word position is 1732, the output of the converter 19 will be 1.732 volts or a little greater than half if the converter has a maximum output of 3.999 volts. Word number 2 will be next to line-up with the read/write amplifier 9 and the same shifting operation will take place with the stored value shifted into the Y-register 17 and a timing signal shifted into the X-register 18. Again the Z-axis amplifier will blank out the oscilloscope display thereby preventing a disturbance from appearing during the shifting operation.

Turning off the oscilloscope during the shifting operation is possible because of the unique operation of the magnetic drum 1. There is a time gap of 33 microseconds between words stored on the drum, during this time gap the registers are in a stable condition and the Z-axis amplifier turns-on the electron beam. The length of this time delay is not critical, it must be of sufficient length to allow the full intensity of the electron beam to appear on the cathode ray tube. The 33 microsecond delay I mentioned resulted from employing a magnetic drum having a 100 word capacity, each of 25 bits, and operating at 1800 r.p.m., each word being 300 microseconds long. By turning the display on only during the word interval it is made to appear as a series of discrete dots. Each dot representing a reading stored in the historical data section 4. With a 100 word historical data storage capability good resolution can be obtained.

The process of shifting the stored information along with this position signal continues until words 3 through 99 have been displayed as dots on the oscilloscope 22. This procedure is continuously repeated and with a magnetic drum revolving at 1800 r.p.m. repeated every $\frac{1}{30}$ of a second. Since the repetition rate is so fast an operator viewing the oscilloscope display has the impression the trace is stationary.

At the end of each time interval, set by the time interval switch 10, a new value of the variables selected for display will be transferred to the historical data storage section 4 from the current data section 2. During this transfer period one trace on the oscilloscope is turned off through suitable circuitry in the display control 11. To complete the transfer procedure the display control 11 connects the read/write amplifier 6 to the read/write amplifier 9. The oldest reading stored in the historical section is removed and replaced with the latest sample stored in the current data section 2. For example, if the oldest reading was stored at position 1 it would be replaced with the latest reading from the current data section 2. The oldest reading would now be stored at position 2 and when displayed on the oscilloscope would appear as the first dot to the left. The reading stored at position 1 would be the most recent and the timing pulses to the X-register 18 would position it as the last dot on the display. This shifting of the display one position to the left occurs after each up-dating cycle and is controlled by the display control 11. Thus, if the time interval switch 10 was set for one minute intervals between up-dating transfers it will take 100 minutes for a point to move from the last position on the trace to the first. The display appearing on the oscilloscope will be for the last 100 minutes, in other words, the trend of a given variable for the past 1 hour and 50 minutes will be displayed. By merely adjusting the time interval between up-dating transfers the length of time represented by the display can be varied. Using a time interval switch having a range of 15 seconds to 2 minutes permits a variation in the trend display from 25 minutes to 2 hours and 20 minutes.

In order to locate the oldest reading of a variable stored in the historical storage section 2, the display control 11 includes a time address counter 15 and a relative address counter 23. If it is assumed that the oldest data is stored at address 27 then the next oldest will be at address 28 and the latest at address 26. With the oldest data at address 27 the time address counter will contain the number 27.

In operation a system wide address counter 5 would continually distribute address information to the display control 11, in particular to the time address counter 15. The system address would be compared in compare circuit 20 with the number in the time address counter 15, in this example #27, and when coincidence occurs between the system information and the time counter number the display control would be told the oldest data in the historical storage section 4 is ready for display. Now the relative address counter 23 is set to 00 and the data at address 27 transferred to the Y-register 17. Simultaneously the number 00 in the relative address counter 23 is gated into the X-register 18 and the first dot appears on the cathode ray tube of the oscilloscope. The relative address counter 23 is incremented one number to 01 and the data at address 28 transferred to the Y-register 17. The second dot now appears on the oscilloscope; the procedure is repeated until all one hundred readings in the historical storage section have been displayed.

When the updating operation begins the time address counter 15 would be incremented to the next highest number, in the previous example from number 27 to 28. The relative address counter 23 would be turned off and a display trace would be skipped as explained previously. After the latest readings have been stored at the previously oldest address, number 27 in the prior example, the system address would again coincide with the time address counter 15 and the relative address counter 23 set to 00. A new display would begin with the oldest data at address 28 displayed in the first trace position. This operation of the display control circuit will likewise apply to the additional embodiments hereinafter discussed.

To change from one variable to another it is only necessary to reset the point select switch 13 to a new address number. The read/write amplifier 9 will now shift the stored values of this new variable to the Y-register 17. There may be some slight disruption of the display on the oscilloscope when a new variable has been selected. This will hardly be noticeable due to the extreme speed of my system.

Figure 2:
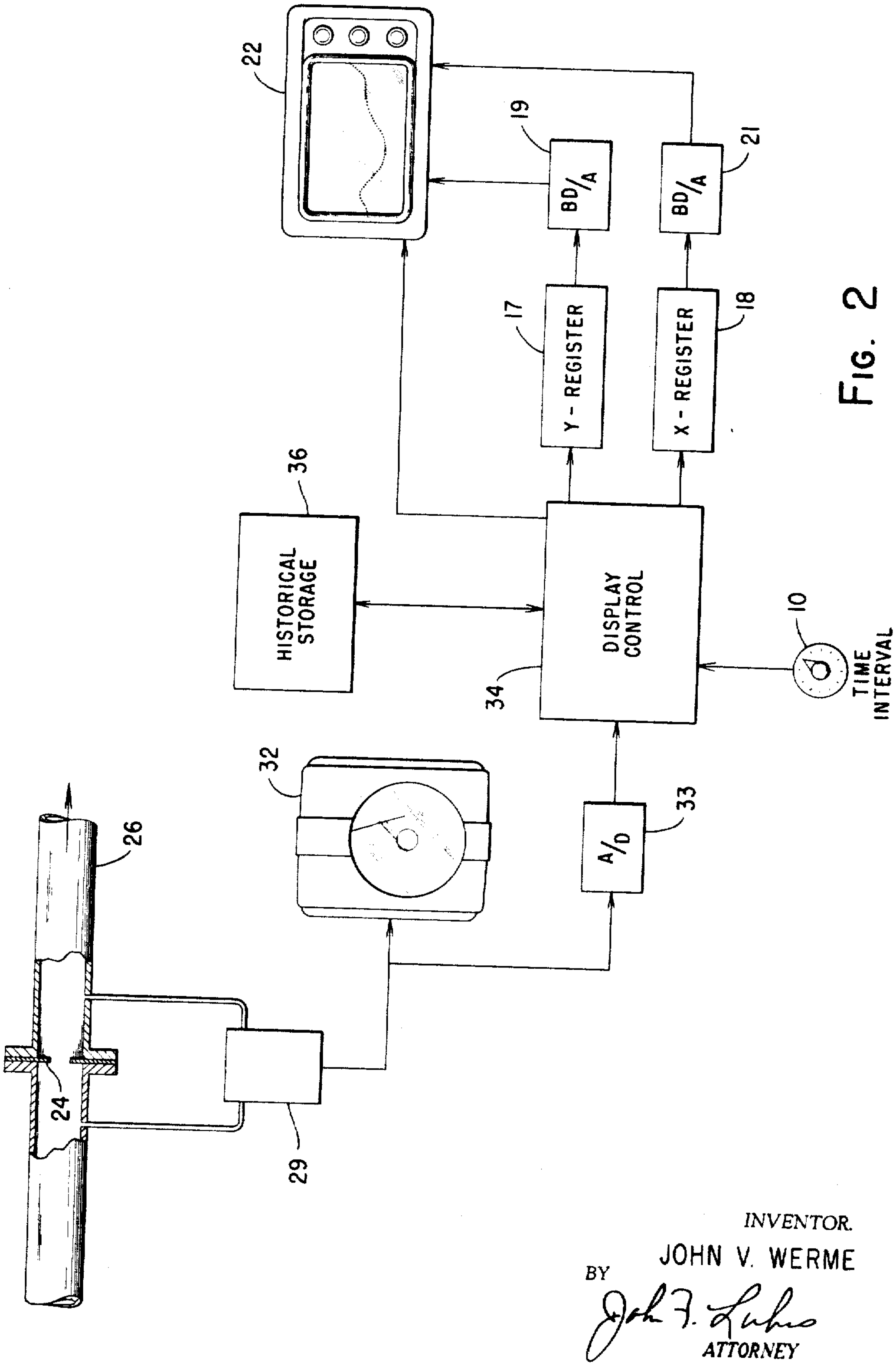
FIG. 2 is a schematic diagram of an oscilloscope display for the trend recording of a single variable.

Referring to FIG. 2, I show an oscilloscope display system for trend recording a single variable. An orifice 24 mounted between two flanges of a pipe 26, develops a differential pressure proportional to fluid flow. A pressure differential transmitter 29 measures the differential pressure and generates an electrical signal proportional thereto. There are a number of differential pressure transmitters that can be employed in this system to produce the desired electrical output, many of which make use of either a bellows or capsule assembly to convert the differential pressure to a linear motion. The linear motion in turn actuates a pick-up device, such as a movable core transformer. To produce a direct current signal the transformer output is rectified and filtered.

The output of the differential pressure transmitter 29 connects to a recorder 32 which serves to make a permanent record of the measured variable for historic purposes or long range studies. Most recorders used in systems such as I show are of the circular chart design. They can be designed to record various time increments in one chart revolution; such as an 8 hour period, a 24 hour period or even several days. A recorder of the circular chart type that is well suited for this purpose is described in the U.S. Patent 2,873,163 issued to Michael Panich and assigned to the same assignee.

Often it is desirable to know the trend behavior of a variable for a short period of time in addition to making a permanent recording. Where such a trend is desired I connect an analog to digital converter 33 to the output of the differential pressure transmitter 29. Analog to digital converters generally fall into two categories, in one category a linear "ramp" or "sawtooth" voltage waveform is generated by circuitry internal to the converter. The voltage input from the transmitter 29 is converted into a time interval by measuring the time required for the "ramp" voltage to increase from some reference point to the direct current voltage input. Conversion from the time interval to a digital number is accomplished by sending a continuous series of uniformally spaced "clock" pulses to a counter. Converters in the second category function through a process of successive comparison of the input signal from the transmitter 29 with a set of voltages of known value. This second method has often been referred to as the balancing scale method. Each of the various types of analog to digital converters can be adapted to binary or the decimal system of numbers. Throughout my description I use the binary decimal system exclusively.

The binary decimal output of the analog to digital converter 33 connects to a display control 34 of a type similar to the display control 11 of FIG. 1. The display control 34 transfers and shifts the binary data from one section of the system to another. Internal components of the control circuit 34 are standard computer hardware, the explanation of which is not deemed necessary. Also connected to the display control 34 is a historical data storage unit 36 which may be a magnetic drum as in FIG. 1 or any of the other well known storage means such as magnetic tape or cores. The historical data unit 36 stores periodic readings of the measured variable as generated at the output of the analog to digital converter 33. Since I used as an example a one-hundred word storage unit in the system of FIG. 1, the storage unit 36 will also be assumed to have a one-hundred word storage capability. Therefore, one-hundred readings of the flow measurement will be stored in the historical data storage unit 36 at all times. To select the time interval between readings stored in the unit 36 a time interval switch 10 is provided. To facilitate my description I will use the same reference numbers throughout for like components in the various figures.

As the stored readings are presented to the display control 34 they are shifted into the Y-register 17 and converted to an analog signal in the binary decimal/analog converter 19. Simultaneously, a series of timing pulses is shifted into the X-register 18 and likewise converted to an analog signal in a binary decimal/analog converter 21. The analog representation of this historical data is connected to the Y-axis amplifier of the oscilloscope 22 and the analog voltage representation of the timing signal connected to the X-axis amplifier. Electron beam intensity control of the scope 22 is provided by controlling the Z-axis amplifier from the display control 34.

*Operation of FIG. 2*

Fluid flowing in pipe 26 develops a differential pressure across orifice 24 which the differential pressure transmitter 29 develops into a direct current analog signal. This direct current signal is recorded in the recorder 32 and converted to a binary decimal signal in the analog to digital converter 33. At certain preselected time intervals, controlled by the time interval switch 10, the output of the converter 33 is transferred through the display control 34 to the historical data storage unit 36.

Between transfers the display control 34 shifts the stored data from the storage unit 36 to the Y-register 17. The display control circuit 34 also shifts a spot positioning signal to the X-register 18. From here on the operation of the system of FIG. 2 is identical to that of FIG. 1. Thus, the oscilloscope display is turned down during the shifting operation and turned up in the time interval between subsequent readings stored in historical data storage unit 36. The trend of the measured variable appears as a series of spots on the face of the oscilloscope's cathode ray tube. The oldest stored reading appears in the first position at the extreme left of the display and the latest reading appears at the last position at the extreme right. When a new reading is transferred from the analog to digital converter 33 to the historical storage unit 36 the display shifts one position to the left and the oldest reading is removed.

If a time interval has not been provided for between subsequent readings stored in the historical data storage unit 36 additional circuitry is required. As explained with reference to FIG. 1, the registers 17 and 18 are stable only in the 33 microsecond delay between words. At all other times they are in a state of flux and their outputs are a jumble of useless information. When the stored readings are presented as a continuous train of pulses, without a time delay between words, additional circuitry must be provided to stabilize the X- and Y-registers.

Referring to FIG. 3, I show this additional circuitry in conjunction with the system of FIG. 2. The time interval switch 10 and historical data storage unit 36 connect to a display control 37. Current readings of a variable will be supplied the system either from a magnetic drum as in FIG. 1 or an analog to digital converter as in FIG. 2. The display control 37 shifts the stored readings from the historical data unit 36 in a continuous series, without interruption between words, to a shift register 38. The shift register 38 is identical to either the X-register or the Y-register of FIG. 1. These registers can accept information serially or in parallel entry depending on the circuit transferring the information. The display control 37 shifts the stored information into the shift register 38 in serial entry. When the last pulse of a word train enters the register 38 the display control 37 generates a transfer pulse to a gate register 39 to transfer the entire word to the Y-register 17. The transfer from the shift register 38 to the Y-register 17 is a parallel transfer, that is, the entire word is transferred simultaneously through the gate register 39. A gate register is like a conditional switch, an output signal is produced only when certain input conditions are met. An AND circuit is the simplest form of a gate; when both inputs to the AND circuit are logic ONE the output will be a logic ONE, when one input is in a logic ZERO and the other a logic ONE the output is a logic ZERO. In the case of the gate register 39 there would be one AND circuit for each pulse position in the shift register 38. One input to each of the AND circuits would be connected to a common bus and upon receipt of the transfer pulse each AND circuit would transfer one pulse from the shift register 38 to the Y-register 17.

To better explain the transfer operation from the shift register 38 to the Y-register 17 reference is made to FIGS. 3*a*, 3*b* and 3*c*. Shown here is one word time with 12 bit positions each of which requires one flip-flop circuit in the shift register 38. The number of bits used to make up a word is not significant, it will vary with the system and is a matter of design. Referring to the lefthand side of FIG. 3*a*, the last pulse $L_1$ for the first word has just entered the shift register 38. A finite amount of time exists between pulse $L_1$ of word one and pulse $A_2$ of word two during which the display control 37 generates transfer pulse $T_1$ which conditions the gate register 39 to transfer word one to the Y-register 17. Pulse $A_2$, of word two, enters the shift register 38 at the first flip-flop position and word two is serially shifted into the register one pulse at a time from the display control 37. As each pulse enters the register at its first position the preceding pulses are all shifted one position to the right. This operation continues until the last pulse $L_2$ of word two enters the shift register as shown in FIG. 3*b*. In the time interval between pulse $L_2$ of word two and pulse $A_3$ of word three the display control 37 generates a transfer pulse $T_2$ which conditions the gate register 39 to transfer word two to the Y-register 17. Words three through ninety-nine are similarly shifted into the shift register 38 and transferred to the Y-register 17.

Since the timing signal is keyed to the stored information it likewise will be transferred from the display control 37 in a continuous stream of bits. Therefore, an arrangement similar to that used in transferring the word bits is required. Such an arrangement includes a shift register 41 connected to receive a pulse train from the display control 37 and a gate register 42 for transferring the position signal from the shift register 41 to the X-register 18. After a complete position signal has been entered into the shift register 41 the same transfer pulse used to condition gate register 39 will also condition the gate register 42 to transfer the signal to the X-register 18.

While gating words into the Y-register 17 and the position signal into the X-register 18 these units are in a transition state as explained earlier. To prevent blurring of the trend display during this transition period the display is turned off by a signal from the display control 37 to the Z-axis amplifier of the oscilloscope 22. In the system of FIG. 3, the Z-axis amplifier would turn-on the display while information was being shifted into the shift registers 38 and 41 since the X and Y registers are in their stable condition.

Referring to FIG. 4, there is shown an embodiment of my invention for comparing two signals on the same oscilloscope or for displaying different signals on separate scopes. The magnetic drum 1 is identical to that shown and described in FIG. 1, as such it has a program storage section 3 and a historical data storage section 4. The read amplifier 8 would read a stored program for use by a display control 44 which required additional internal components over that used in the display control 11. Two read/write amplifiers 9 and 9*a* are required to transfer the readings of the two variables from and to the historical data storage section 4.

Also connected to the display control 44 are two point select switches 13 and 13*a* and one timing interval switch 10. The time interval switch 10 would be set to the desired frequency for transferring information from the current data section of the memory, as in FIG. 1, or the analog to digital converter of FIG. 2, to the historical data storage section 4. It would also determine the time represented by the trend display of both variables. The point switch 13 would be set for the address of one variable selected for display and the point select switch 13*a* for the second variable selected for display.

The variable having the address set in switch 13 will be transferred from the historical data section 4 to the $Y_1$-register 17 and converted to an analog signal in a binary decimal/analog converter 19. Similarly the variable having the address set in switch 13*a* will be transferred from the storage section 4 through display control 44 to a $Y_2$-register 17*a* and converted to an analog signal in a binary decimal/analog converter 19*a*. This sequence continues for each word stored in the storage section and is identical to that described with reference to FIG. 1 with one exception, there are two transfers carried on simultaneously. A timing signal will also be transferred from the display control 44 to X-register 18 and converted to an analog signal in binary decimal/analog converter 21. The display control 44 also supplies a signal to the Z-axis amplifier of an oscilloscope 53 to turn-off the trend display when the registers are in an unstable state.

Except for the parallel transfer of two variables, the systems of FIGS. 1 and 4 are alike up to this point. The oscilloscope 53, however, is different from that used in the system of FIG. 1. It has the usual Z-axis and X-axis amplifiers to control the electron beam intensity and the horizontal display respectively. Instead of one Y-axis amplifier for vertical display control it has two, one for the variable in the binary decimal/analog converter 19 and the other for the variable converted in the binary decimal/analog converter 19*a*.

Two approaches are in common use today for displaying two traces on one cathode ray tube of an oscilloscope. One approach uses a cathode ray tube having two sets of vertical deflection plates and two electron beams. This provides one electron gun and one set of plates for each variable; the variables are displayed simultaneously using this method. The second approach uses a cathode ray tube having one set of deflection plates and one electron beam. Two signals are displayed by using a time sharing circuit which alternates use of the deflection plate and electron gun by both variables.

When two variables are being displayed simultaneously on one cathode ray tube of an oscilloscope an operator can make a quick comparison of the trend established by each. The length of the trend, that is, the time represented by the display, being controlled by timing switch 10.

With a slight modification, the system of FIG. 4 can be made to exhibit one variable on both displays, each having its own time base. To provide a different time base for each display an additional time interval switch 10*a* would be connected to the display control circuit 44. The time interval switch 10*a* would control the updating of the variable for one display while the time interval switch 10 controls the updating of all other variables in the historical data section 4. With this system one of the time interval switches could be set to display a relatively short trend, for example, one hour, and the other set to display a long trend, possibly 24 hours. Using this arrangement an operator can easily compare the long and short trend of any variable.

An obvious extension of the system shown in FIG. 4 would be to provide each variable to be displayed with its own oscilloscope. Referring to FIG. 4, this modification is shown in dotted outline and includes an oscilloscope 54 connected in a manner similar to that of oscilloscope 53. Thus, the intensity of the display would be controlled by a signal connected to the Z-axis amplifier and the horizontal position controlled by the analog signal connected to the X-axis amplifier from the binary decimal/analog converter 21. With only one variable displayed on each scope the connection from the binary decimal/analog converter 19*a* to the oscilloscope 53 would be eliminated and instead the converter 19*a* would be connected to the Y-axis amplifier of the oscilloscope 54.

Another modification of the system of FIG. 4 would be to use an oscilloscope of the type shown in FIG. 1 and only one Y-register. The display control circuit 44 would require modification and include a time sharing circuit which alternately connects one or the other read/write amplifier to the Y-register. There is a definite cost advantage over the parallel register system shown in FIG. 4, less equipment would be involved and a lower cost scope could be employed. One disadvantage, however, would be the slower repetition rate of each display, instead of one display repeating every $\frac{1}{30}$ of a second it would now repeat only every $1/15$ of a second, this may cause some flickering of the display but is not considered objectionable.

The foregoing are only a few of the many embodiments of my invention. Many modifications can be made to the systems and components I have described without departing from the scope of the invention as set forth in the following claims.

What I claim as new and desire to secure by Letters Patent of the United States is:

1. Apparatus for displaying a variable quantity, comprising:
- a magnetic drum having three storage sections including a current data storage section for storing in digital form the most recent readings of a plurality of variables, an historical data storage section for storing the historical data of a selected number of said plurality of variables, and a program section for storing an operation program;
- an oscilloscope having a cathode ray tube, a Y-axis amplifier for controlling the vertical display, an X-axis amplifier for controlling the horizontal display and a Z-axis amplifier for controlling the intensity of the display, said oscilloscope providing a means for displaying the individually stored readings as a succession of dots;
- a read/write amplifier associated with said magnetic drum for reading information from and writing information into the historical data section of said drum;
- a read amplifier associated with said magnetic drum for reading the stored operation program;
- a second read/write amplifier associated with said magnetic drum for reading information from and writing information into the current data section of said magnetic drum;
- a data register;
- a timing register;
- a display control circuit connected to said first and second read/write amplifiers, to said read amplifier, to said data register and to said timing register, said display control circuit controlling the writing of information into and reading information from said current data storage section, the transfer of readings from the current data section to the historical data section, the shifting of information from the historical data section to the data register and the shifting of position signals to the timing register which are not individually associated with a specific historical data section location but rather are associated with a different data location each time data readings are transferred from the current data section to the historical data section;
- a system address counter continually responsive to the historical data word locations on the magnetic drum and incremented thereby from a minimum value corresponding to the first data word location to a maximum value corresponding to the last data word location for each revolution of the magnetic drum;
- a digital to analog converter connected to said data register and said Y-axis amplifier for converting the stored information to an analog voltage;
- a second digital to analog converter connected to said timing register and said X-axis amplifier for converting the digital timing signal to an analog voltage; and
- means synchronized with said shifting operation and connected to the Z-axis amplifier of said oscilloscope for reducing the intensity of the display during said transferring operation.

2. Apparatus for displaying a variable quantity as set forth in claim 1 including a time interval switch means for setting the frequency of transferring data from said current data section to said historical data section.

3. Apparatus for displaying a variable quantity as set forth in claim 2, including a point select switch for selecting the variable from said historical data section to be displayed on said oscilloscope.

4. Apparatus for displaying a variable quantity as set forth in claim 1 wherein said display control circuit includes:
- a time address counter responsive to the historical data word locations and indicating a value corresponding to the historical data word location in which the oldest data reading is stored; said time address counter being incremented each time data readings are transferred from the current data section of the magnetic drum to the historical data section;
- a compare circuit responsive to the incremented values of said system address counter and said time address counter so as to generate an output signal when coincidence occurs between the count value in said counters; and
- a relative address counter responsive to the historical data word locations, the count value of which establishes the position signal in the timing register; said counter set to a minimum counter value by the output signal of said compare circuit so as to fix the oscilloscope location of the oldest historical data reading at a set reference point and thereby establish a chronological time-base reference for the remaining historical data words.

5. Apparatus for variable display, comprising:
- a memory having an historical data section for storing in digital form the historical data of a selected number of variables and a program section for storing an operation program;
- an oscilloscope having a cathode ray tube, a first Y-axis amplifier for controlling the vertical display of one variable, a second Y-axis amplifier for controlling the vertical display of a second variable, an X-axis amplifier for controlling the horizontal display and a Z-axis amplifier for controlling the intensity of the display, said oscilloscope providing a means for displaying the individually stored readings as a succession of dots;
- a first data register;
- a second data register;
- a timing register;
- a display control circuit connected to said memory, to said first data register, to said second data register and to said timing register, said display control circuit controlling the shifting of data to the timing register and the simultaneous shifting from said historical data section information for one variable to said first data register and information for the second variable to said second data register;
- a system address counter continually responsive to the historical data information locations of the variable information on the magnetic drum and incremented from a minimum value corresponding to the first data information location on the drum to a maximum value corresponding to the last data location for each drum revolution;
- a time interval switch means for setting the frequency of entry of data into said historical data memory section;
- a first point select switch means connected to said display control circuit for selecting one variable for display on said oscilloscope;
- a second point select switch means connected to said display control circuit for selecting a second variable for display on said oscilloscope;
- a first digital to analog converter connected to said first data register and said first Y-axis amplifier for converting the stored information of the first variable to an analog voltage;
- a second digital to analog converter connected to said data register and said second Y-axis amplifier for converting the stored information of the second variable to an analog voltage;
- a third voltage to analog converter connected to said timing register and said X-axis amplifier for converting the digital timing signal to an analog voltage; and means synchronized with said information shifting operation and connected to the Z-axis amplifier of said oscilloscope for reducing the intensity of the display during said transferring operation.

6. Apparatus for variable display as set forth in claim 5 including a second time interval switch means for setting the frequency of entry of data to said memory for the variable selected by said second point select switch means, said first time interval switch means being effective to control the frequency of entry of information for all other variables stored in said historical data memory section.

7. Apparatus for variable display comprising:

a memory having an historical data section for storing in digital form the historical data of a selected number of variables and a program section for storing an operation program;

a plurality of oscilloscopes each having a cathode ray tube, a Y-axis amplifier for controlling the vertical display, an X-axis amplifier for controlling the horizontal display and a Z-axis amplifier for controlling the intensity of the display, said oscilloscopes providing a means for displaying the individually stored readings as a succession of dots;

a plurality of data registers;

a timing register;

a display control circuit connected to said memory, to said timing register and to said plurality of data registers, said display control circuit controlling the shifting of position signals to the timing register to position the historical data information in a chronological sequence on said oscilloscopes and the simultaneous shifting from said historical data section the information of each variable to its respective data register;

a time interval switch means for setting the frequency of entry of data into said historical data memory section;

a plurality of point selector switch means connected to said display control circuit for selecting the individual variables for display on each of said oscilloscopes;

a plurality of digital to analog converters, one connected to each of said data registers and to one of said oscilloscopes for converting the digital information to an analog voltage;

a digital to analog converter connected to said timing register and said plurality of oscilloscopes for converting the horizontal position signal to an analog voltage; and means synchronized with the information shifting operation and connected to the Z-axis amplifier of each of said oscilloscopes for reducing the intensity of the display during said shifting operation.

8. Apparatus for variable display as set forth in claim 7 wherein said memory is a magnetic drum.

9. Apparatus for variable display as set forth in claim 8 including a first read/write amplifier associated with the historical section of said magnetic drum and connected to said display control circuit for reading the stored values of the first selected variable and a second read/write amplifier connected and operating in parallel to said first amplifier for reading the stored values of said second selected variable.

10. Apparatus for variable display as set forth in claim 7 further including a system address counter continually responsive to the historical data information locations of the variable information on the magnetic drum and incremented from a minimum value corresponding to first data information location on the drum to a maximum value corresponding to the last data information for each revolution of the magnetic drum.

11. Apparatus for displaying a variable quantity as set forth in claim 7 wherein said display control circuit includes:

a time address counter responsive to the historical data information locations of the numerous variables and indicating a value corresponding to the historical data information location of the variables in which the oldest data information is stored; said time address counter being incremented each time said oldest data information of said variables is updated;

a compare circuit responsive to the incremented values of said system address counter and said time address counter to generate an output signal when coincidence occurs between the count value in said counters; and a relative address counter responsive to the historical data information locations, the value of which establishes the position signal in the timing register; said counter is set to a minimum counter value by the output signal of said compare circuit so as to establish a common oscilloscope reference position for the oldest data information of each of said variables and thereby establish a chronological time-base reference for the remaining historical data information associated with each variable.

12. Apparatus for displaying a variable quantity as set forth in claim 5 wherein said display control circuit includes:

a time address counter responsive to the historical data word locations of said first and second variable and indicating a value corresponding to the historical data word location of each variable in which the oldest data reading is stored; said time address counter being incremented each time said oldest data reading is updated;

a compare circuit responsive to the incremented values of said system address counter and said time address counter so as to generate an output signal when coincidence occurs between the count value in said counters; and a relative address counter responsive to the historical data word locations of said variables, the count value of said counter establishing the position signal in the timing register; said counter set to a minimum counter value by the output signal of said compare circuit so as to fix the oscilloscope location of the oldest historical data readings of said variables at a common reference point and thereby establish a chronological time base reference for the remaining historical data readings of said variables.

References Cited

UNITED STATES PATENTS

| | | | |
|---|---|---|---|
| 3,199,111 | 8/1965 | Jennings et al. | 340—172.5 |
| 3,289,153 | 11/1966 | Savit et al. | 340—172.5 |
| 3,335,411 | 8/1967 | Sinn | 340—152 |

JOHN W. CALDWELL, *Primary Examiner.*

A. J. KASPER, *Assistant Examiner.*